(12) United States Patent
Feldstein et al.

(10) Patent No.: US 9,152,177 B2
(45) Date of Patent: Oct. 6, 2015

(54) SELF-ALIGNING CONNECTION TO A DOCKING STATION

(71) Applicant: Crestron Electronics, Inc., Rockleigh, NJ (US)

(72) Inventors: George Feldstein, Cresskill, NJ (US); Howard Balch, Bloomingdale, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 197 days.

(21) Appl. No.: 13/964,608

(22) Filed: Aug. 12, 2013

(65) Prior Publication Data

US 2015/0043154 A1    Feb. 12, 2015

(51) Int. Cl.
   *H05K 5/00*    (2006.01)
   *H05K 7/00*    (2006.01)
   *G06F 1/16*    (2006.01)
   *H01R 13/60*   (2006.01)
   *H01R 13/66*   (2006.01)

(52) U.S. Cl.
   CPC .................................... *G06F 1/1632* (2013.01)

(58) Field of Classification Search
   None
   See application file for complete search history.

(56) References Cited

U.S. PATENT DOCUMENTS

| | | | | |
|---|---|---|---|---|
| 6,009,168 | A * | 12/1999 | Snyder et al. | 379/446 |
| 6,146,210 | A * | 11/2000 | Cha et al. | 439/680 |
| 6,208,734 | B1 * | 3/2001 | Ortscheid et al. | 379/446 |
| 6,678,892 | B1 | 1/2004 | Lavelle et al. | |
| 6,711,921 | B1 * | 3/2004 | Yang | 70/58 |
| 6,869,304 | B2 * | 3/2005 | Groebe et al. | 439/341 |
| 7,511,954 | B2 | 3/2009 | Tsai et al. | |
| 7,783,070 | B2 | 8/2010 | Fadell et al. | |
| D650,783 | S | 12/2011 | Ausfeld et al. | |
| 8,109,569 | B2 | 2/2012 | Mitchell | |
| 8,113,873 | B1 * | 2/2012 | Sarraf | 439/533 |
| 8,323,040 | B2 | 12/2012 | Prest | |
| 8,413,943 | B1 * | 4/2013 | Li | 248/454 |
| 8,553,407 | B2 * | 10/2013 | Zhou | 361/679.41 |
| 8,659,889 | B2 * | 2/2014 | Dolci et al. | 361/679.41 |
| 8,693,183 | B1 * | 4/2014 | Alameda et al. | 361/679.41 |
| 8,773,845 | B2 * | 7/2014 | Leung | 361/679.01 |
| 8,780,553 | B2 * | 7/2014 | Palmer et al. | 361/679.57 |
| 8,851,912 | B2 * | 10/2014 | Zhang | 439/159 |
| 8,911,246 | B2 * | 12/2014 | Carnevali | 439/170 |
| 8,934,239 | B2 * | 1/2015 | Zhou | 361/679.56 |
| 8,949,144 | B2 * | 2/2015 | Kim et al. | 705/16 |

(Continued)

OTHER PUBLICATIONS

Audiovox IPD-2FM, Owners Manual, pp. 1-18 retrieved on Aug. 12, 2013 from URL: http://a248.e.akamai.net/pix.crutchfield.com/Manuals/220/220IPD2FM.PDF.

*Primary Examiner* — Hoa C Nguyen
*Assistant Examiner* — Xanthia C Cunningham
(74) *Attorney, Agent, or Firm* — Crestron Electronics Inc.

(57) ABSTRACT

A docking station (2) system for a tablet (1) having a data connector, said docking station (2) comprising: a substantially planar docking platform (4) for receiving a tablet (1), said docking platform (4) having an elevated retaining lip (6) extending along the lower edge of said docking platform (4) to engage at least one edge of said tablet (1), and one or more elevated guide rails (14); a cable slide (7) having a cable platform, said cable platform having one or more elevated cable tabs (12) for mechanically securing said unmodified tablet data cable (17) thereon, and a cable slide cover (10) for applying pressure to, in order to align the unmodified tablet data cable connector (18) to a tablet connector (16) of said tablet (1), and slide the cable slide (7) into said docking station (2).

9 Claims, 12 Drawing Sheets

(56) References Cited

U.S. PATENT DOCUMENTS

| | | |
|---|---|---|
| 2003/0222848 A1* | 12/2003 | Solomon et al. .............. 345/156 |
| 2003/0223185 A1* | 12/2003 | Doczy et al. ................. 361/680 |
| 2003/0235029 A1* | 12/2003 | Doherty et al. .............. 361/683 |
| 2004/0011928 A1* | 1/2004 | Helot et al. ................. 248/74.1 |
| 2004/0174671 A1* | 9/2004 | Huang et al. ................ 361/683 |
| 2005/0090301 A1* | 4/2005 | Lange et al. ............... 455/575.8 |
| 2005/0101182 A1* | 5/2005 | Nakamura et al. ........... 439/529 |
| 2009/0064705 A1* | 3/2009 | Maglinger ..................... 62/377 |
| 2011/0164375 A1* | 7/2011 | Hayashida et al. ...... 361/679.41 |
| 2011/0299238 A1 | 12/2011 | Radin et al. |
| 2012/0188689 A1 | 7/2012 | Leung |
| 2012/0189156 A1* | 7/2012 | Leung ........................... 381/387 |
| 2012/0220162 A1* | 8/2012 | Zhou et al. .................... 439/501 |
| 2012/0229967 A1* | 9/2012 | Zhou ........................ 361/679.01 |
| 2012/0293924 A1* | 11/2012 | Dolci et al. ............. 361/679.01 |
| 2013/0003291 A1* | 1/2013 | Zhou ........................ 361/679.41 |
| 2013/0044408 A1 | 2/2013 | Hofer |
| 2013/0050932 A1* | 2/2013 | Williams ................. 361/679.41 |
| 2013/0058036 A1* | 3/2013 | Holzer et al. ........... 361/679.44 |
| 2013/0115821 A1 | 5/2013 | Golko et al. |

* cited by examiner

SELF-ALIGNING CONNECTION TO A DOCKING STATION

BACKGROUND OF THE INVENTION

1. Technical Field

This disclosure generally relates to systems, devices, and methods for docking and storing mobile computing devices, such as tablet computing devices, and more particularly to a tablet computer docking station having a user actuated alignment connector.

2. Background Art

A tablet computer is a mobile computer in the form of a flat, hand held touchscreen. Examples include the Apple iPad™, Kindle Fire™, Motorola Xoom™, Samsung Galaxy™, Blackberry Playbook™, LG Optimus Pad™, Dell Streak™, HP TouchPad™, HTC Flyer™, and Viewsonic ViewPad™. Tablets are traditionally operated through the use of gestures made directly on the tablet screen. Normally, gestures can be made directly on tablet screens using a digital pen, plastic pen, or fingers, etc. Tablets typically display a user interface for their users to interact with. The user interface will normally delineate what input gestures can be made directly on to the tablet screen.

Customarily, a user will operate a tablet while holding it their hands. There are, however, instances where it is desirable to mount a tablet in a fixed position using a docking station. Docking stations sometimes include a docking connector to provide data and/or power communications to other devices. It is typical for docking connectors to protrude from the docking station housing at a fixed angle.

Likewise, it is common for tablets to have a recessed connector receptacle that mates with a protruding docking connector. One example of this arrangement is the 30-pin docking connector described in U.S. Pat. No. 7,783,070 B2 entitled "Media Player System" by Fadell et. al., which is incorporated by reference in its entirety. These types of connectors have a relatively large tolerance fit for mating opposing connectors. The larger tolerances combined with their structural design makes alignment and the mating of these connectors forgiving.

However, alignment becomes problematic with a connector designed with a small tolerance or interference fitment. Connector alignment becomes more critical in tablets utilizing small tolerance connectors because a relatively small misalignment results in the inability to mate connectors. One example of a small tolerance or interference fit type connector is described in U.S. Patent Application Ser. No. 2013/0115821 A1 entitled, "Dual Orientation Connector with External Contacts and Conductive Frame" by Albert J. Golko et. al.

Another problem arises from the abundant variety of connector types used for tablet connectors. Tablet connectors are usually specific to the individual tablet manufacturer and, at times, may even vary across revisions of the same product. On the same hand, it is also typical for docking station connectors to be permanently manufactured into the docking station. This normally results the docking station being tied to the specific device according to connection. Moreover, including a proprietary docking connector on a docking station typically requires obtaining permission, e.g. through negotiated licensing agreements, and paying royalties.

Therefore, there is room for improvement within the art.

SUMMARY OF THE INVENTION

It is to be understood that both the general and detailed descriptions that follow are exemplary and explanatory only and are not restrictive of the invention.

Disclosure of Invention

The present invention provides a tablet docking station system having a self-aligning data connector that assists a user in the alignment and insertion of a mounted data cable connector into a tablet connector.

According to a first aspect, the present invention provides a docking station system for a tablet having a data connector. The docking station comprises a substantially planar docking platform for receiving a tablet. The docking platform has an elevated retaining lip along the lower edge. The retaining lip forms a groove for slidibly engaging one edge of the tablet. The docking station further comprises a cable slide having a cable platform. The cable platform has one or more elevated cable tabs for mechanically securing an unmodified tablet data cable thereon. The cable slide further has a cable slide cover for covering and pushing the cable slide into the docking station.

According to a second aspect, the present invention provides a method for aligning and inserting an unmodified tablet data cable routed inside docking station system to a tablet connector, comprising the steps of: (a) placing an edge of the tablet behind an elevated retaining lip; (b) laying the tablet flat down against the docking platform; (c) sliding the tablet until the tablet connector interacts with the connector of a data cable, thereby pushing a cable slide partially out of the docking station; and (d) pushing the cable slide cover back into the docking station system, thereby guiding a data cable into a proper alignment with the tablet connector and fully inserting the unmodified tablet data cable connector.

According to a third aspect, the present invention provides a docking station system for pre-wiring a docking station system with an unmodified third-party tablet data cable inside the docking station.

The present invention seeks to overcome or at least ameliorate one or more of several problems, including but not limited to: aligning a tablet connector to an unmodified tablet data cable previously routed inside docking station.

Additional aspects and advantages of the invention will be set forth in part in the description which follows and, in part, will be obvious from the description, or may be learned by practice of the invention.

BRIEF DESCRIPTION OF THE DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

BRIEF DESCRIPTION OF THE SEVERAL VIEWS OF THE DRAWINGS

Figure 1:
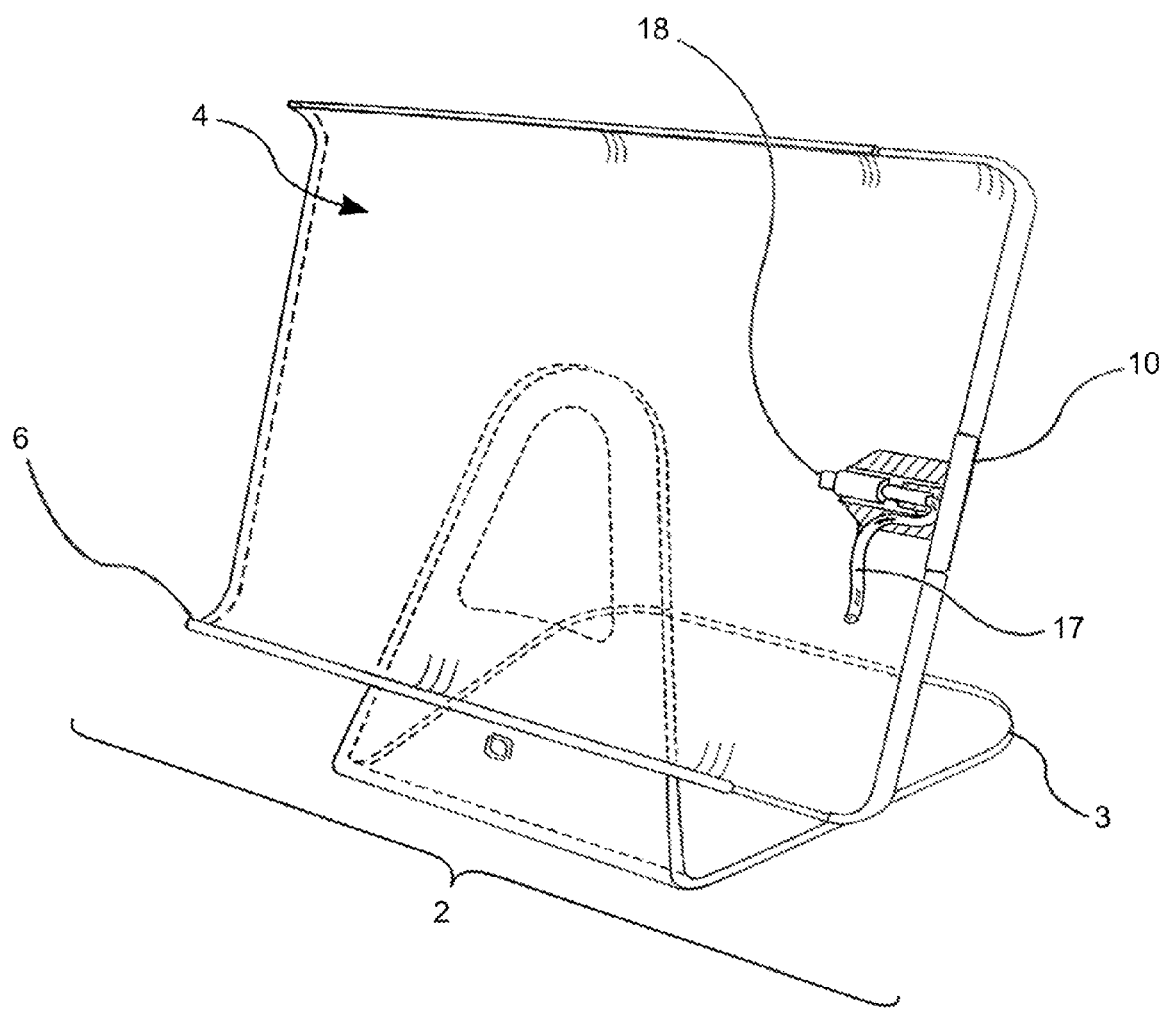

These and other aspects and advantages of the present invention will become apparent and more readily appreciated from the following description of the embodiments, taken in conjunction with the accompanying drawings of which:

FIG. 1 shows a front right perspective view of a tablet docking station in accordance with an embodiment of the invention.

Figure 2:
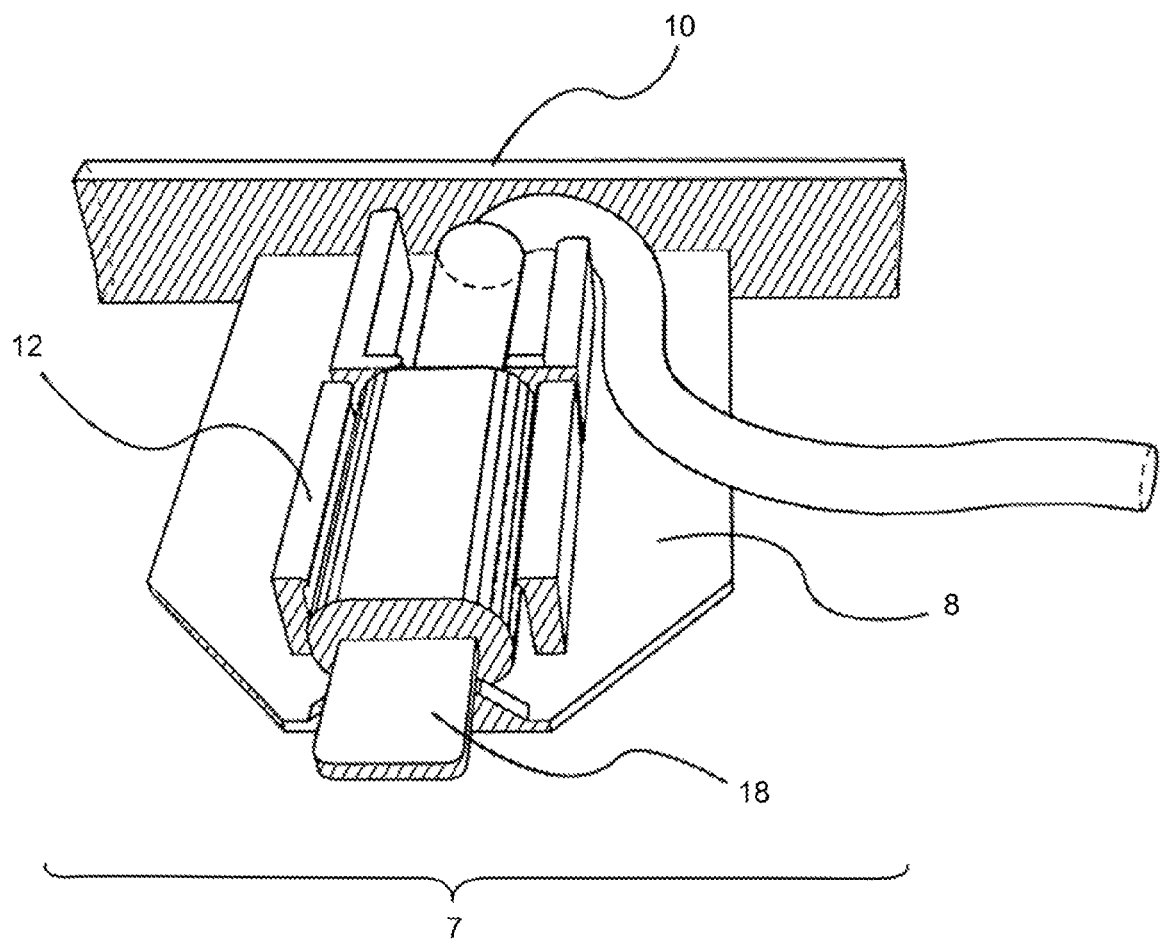

FIG. 2 shows a front right perspective view of the cable slide with a data cable inserted thereon in accordance with an embodiment of the invention.

Figure 3:
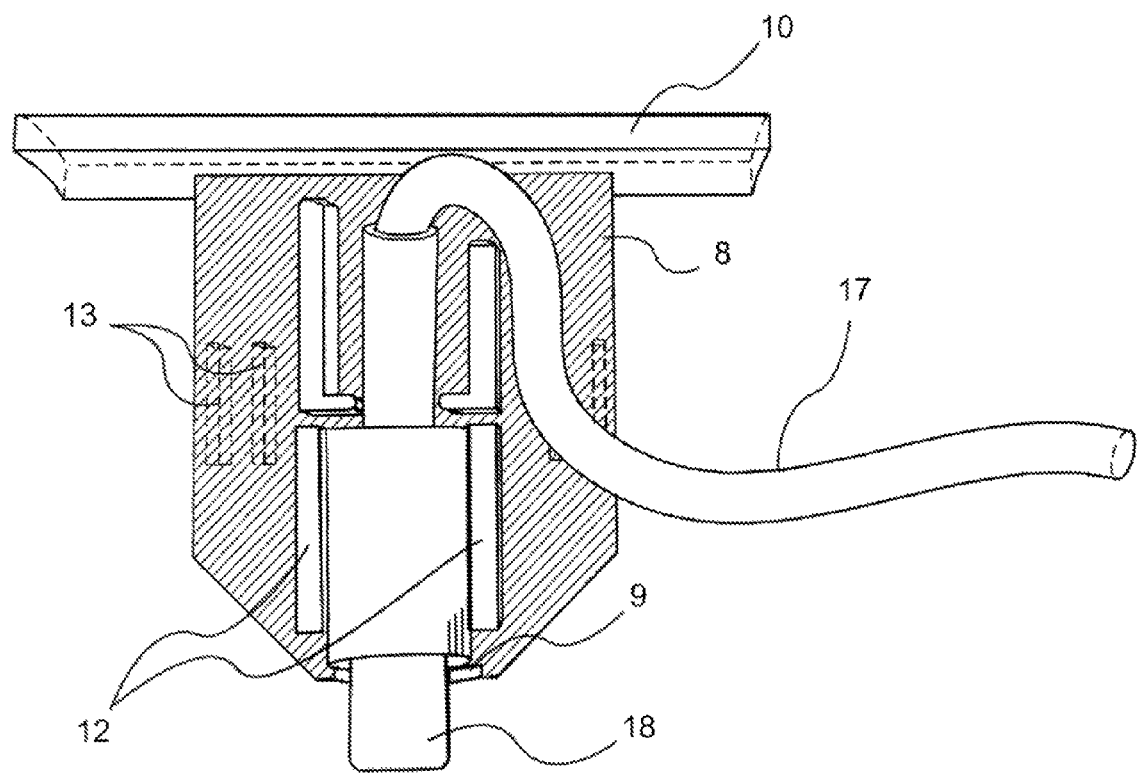

FIG. 3 shows a top perspective view of the cable slide with a data cable inserted thereon in accordance with an embodiment of the invention.

Figure 4:
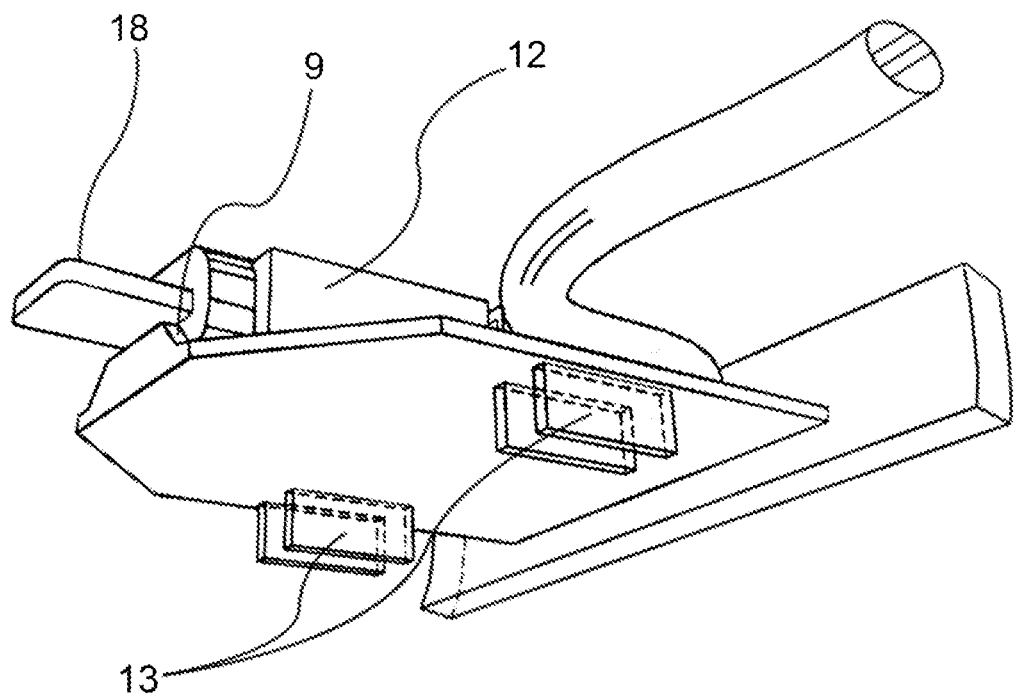

FIG. 4 shows a bottom right perspective view of the cable slide with a data cable inserted thereon in accordance with an embodiment of the invention.

Figure 5:
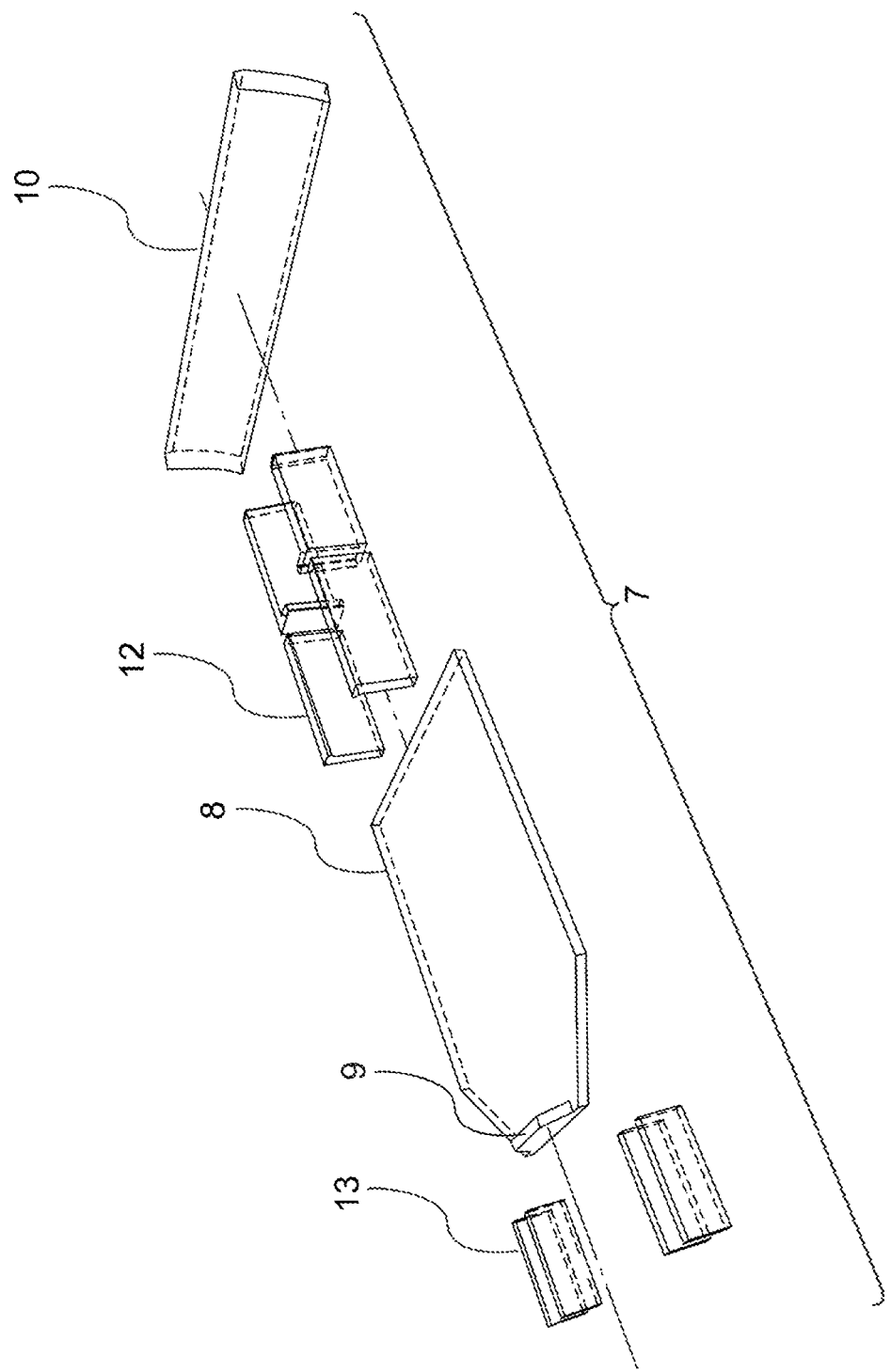

FIG. 5 shows an exploded perspective view of the cable slide in accordance with an embodiment of the invention.

Figure 6:
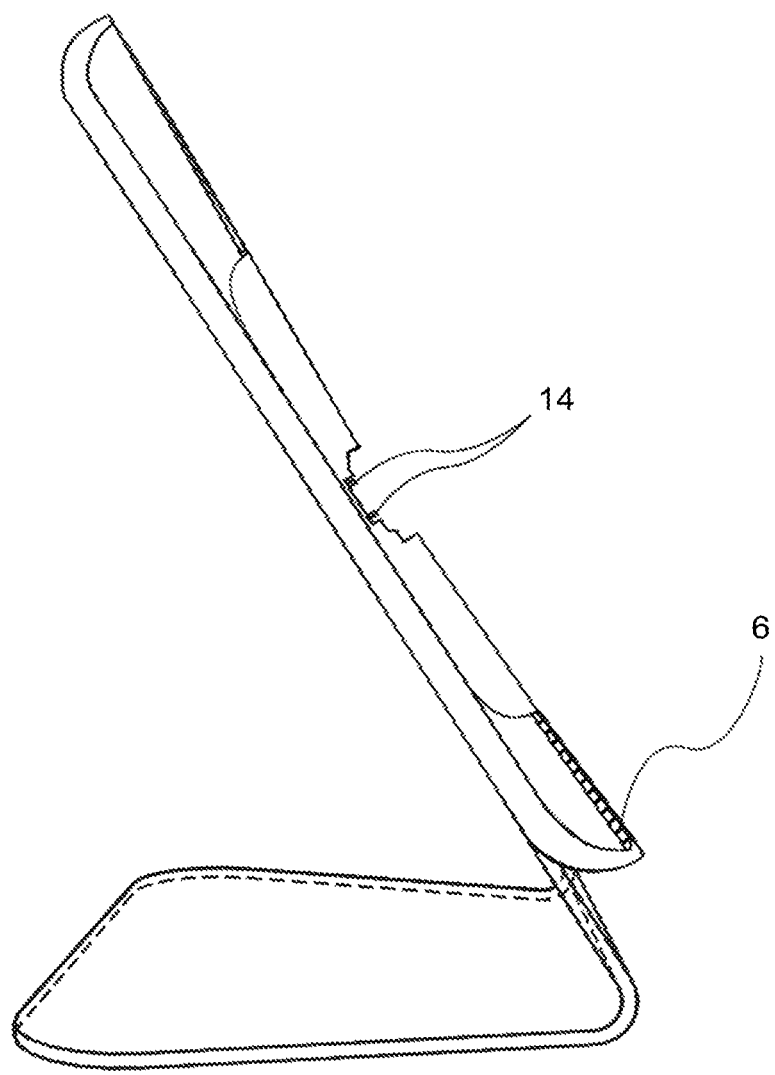

FIG. 6 shows a left side elevation view of the tablet docking station with the cable slide removed in accordance with an embodiment of the invention.

Figure 7:
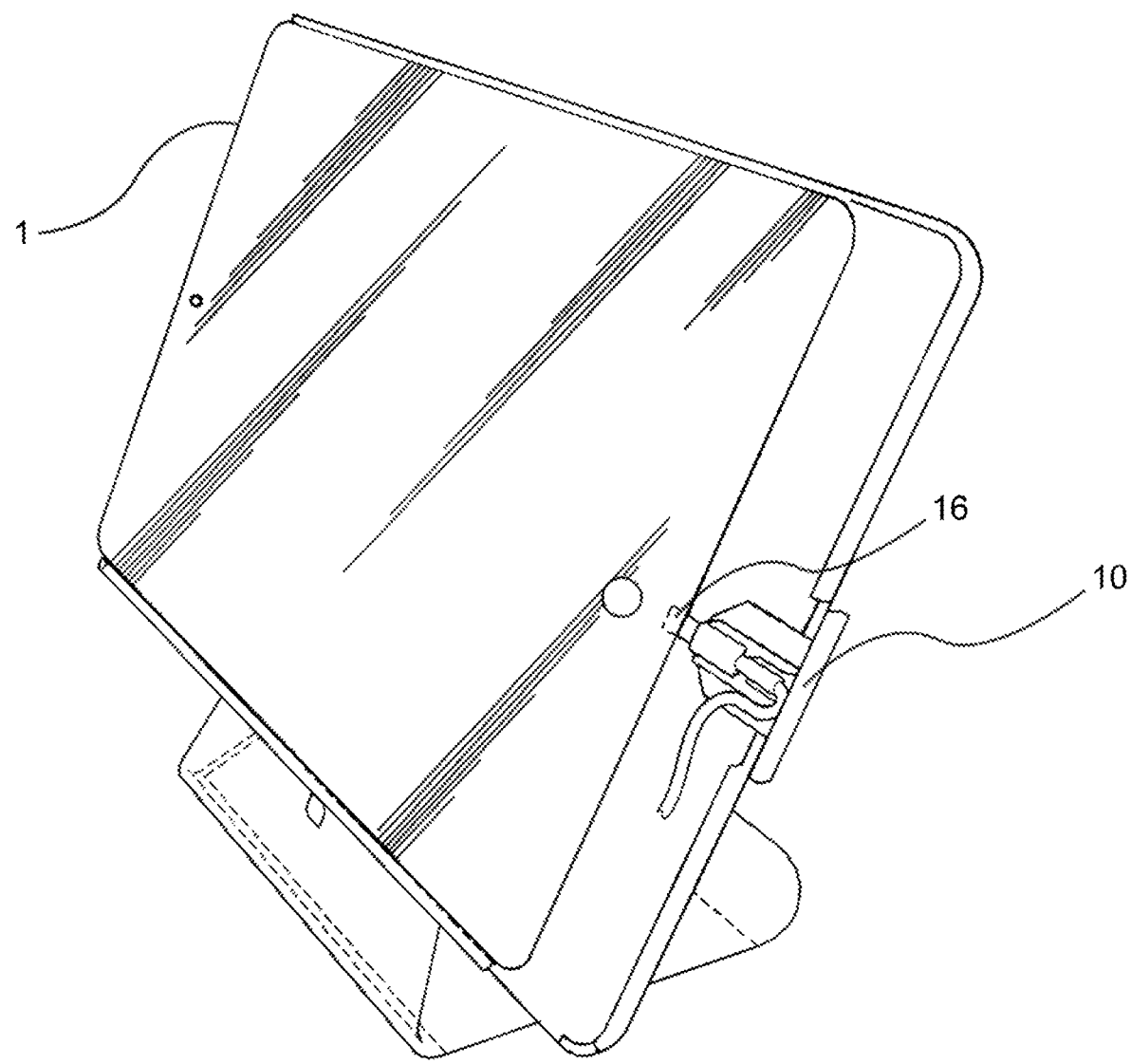

FIG. 7 shows a front right perspective view of the tablet docking station having a tablet fully inserted and the cable slide in the pushed open position.

Figure 8:
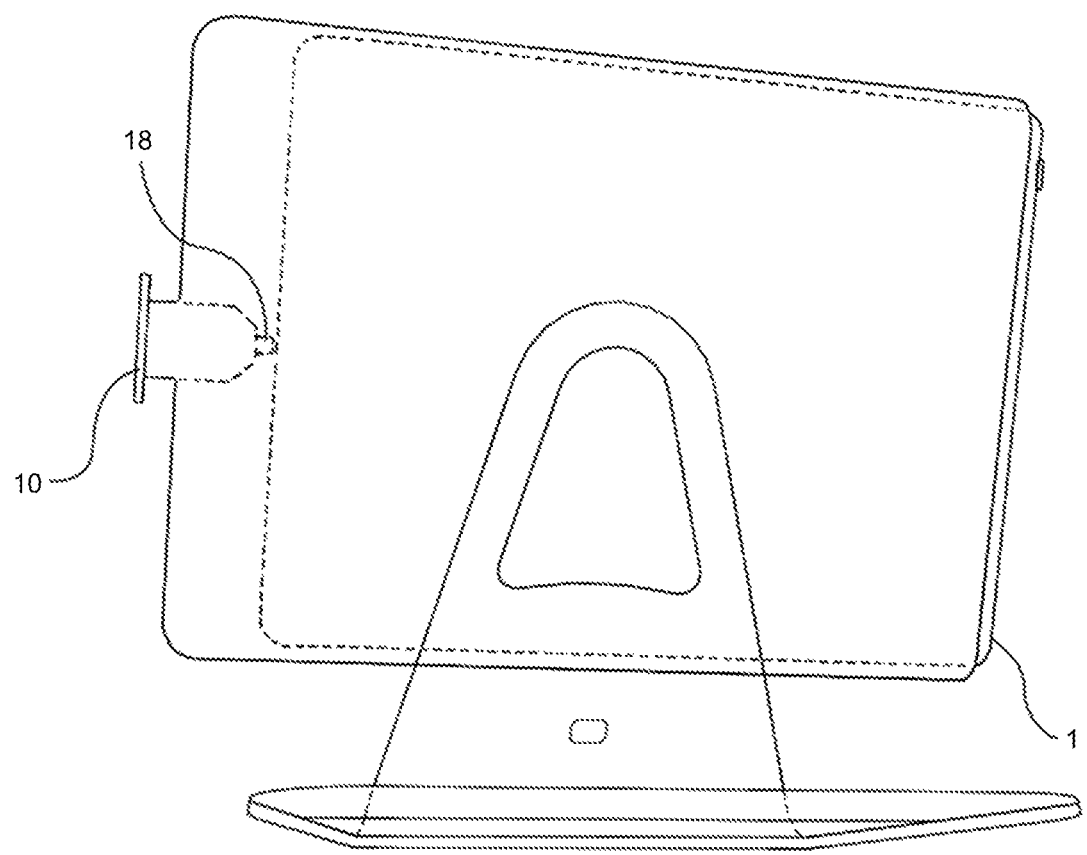

FIG. 8 shows a back left perspective view of the tablet docking station with a tablet fully inserted and the cable slide in the pushed open position.

Figure 9:
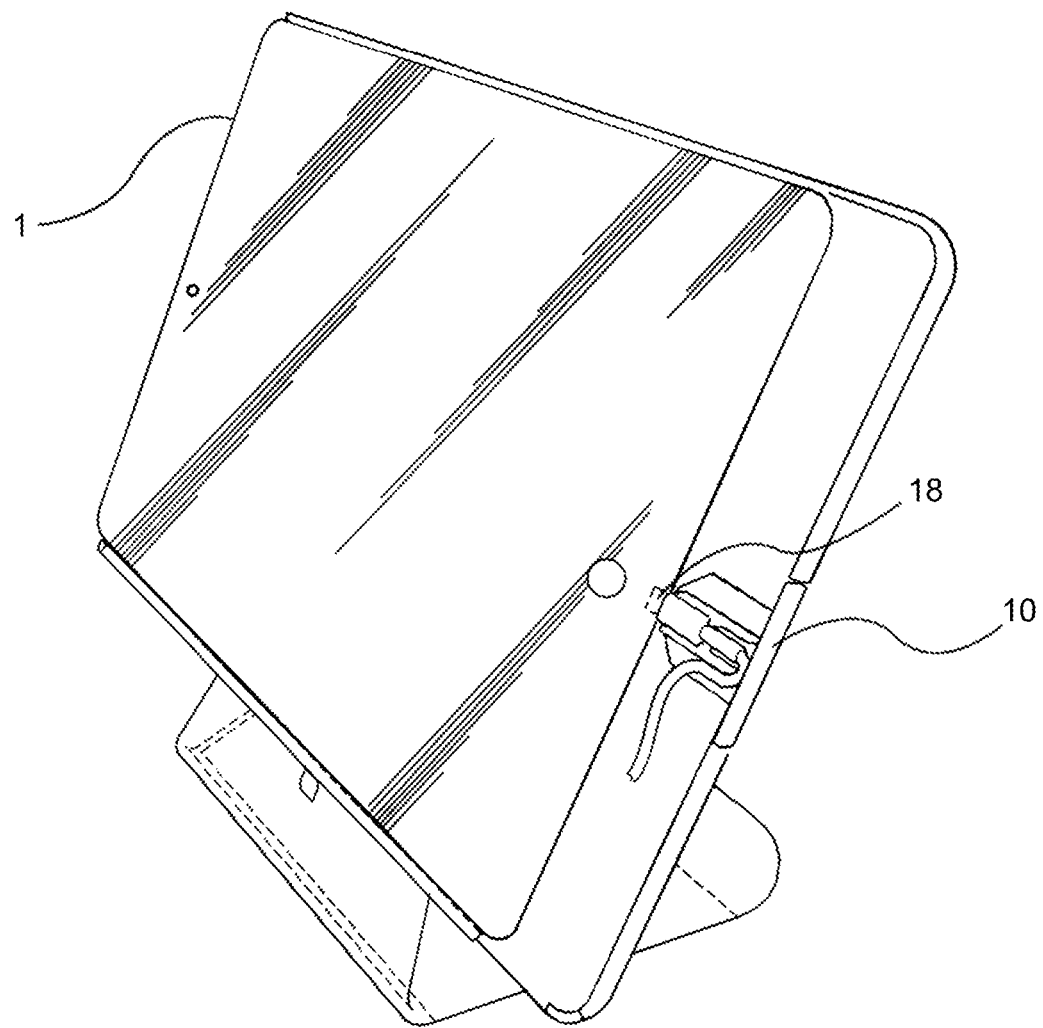

FIG. 9 shows a front right perspective view of the tablet docking station with a tablet fully inserted and the cable slide in the fully inserted position.

Figure 10:
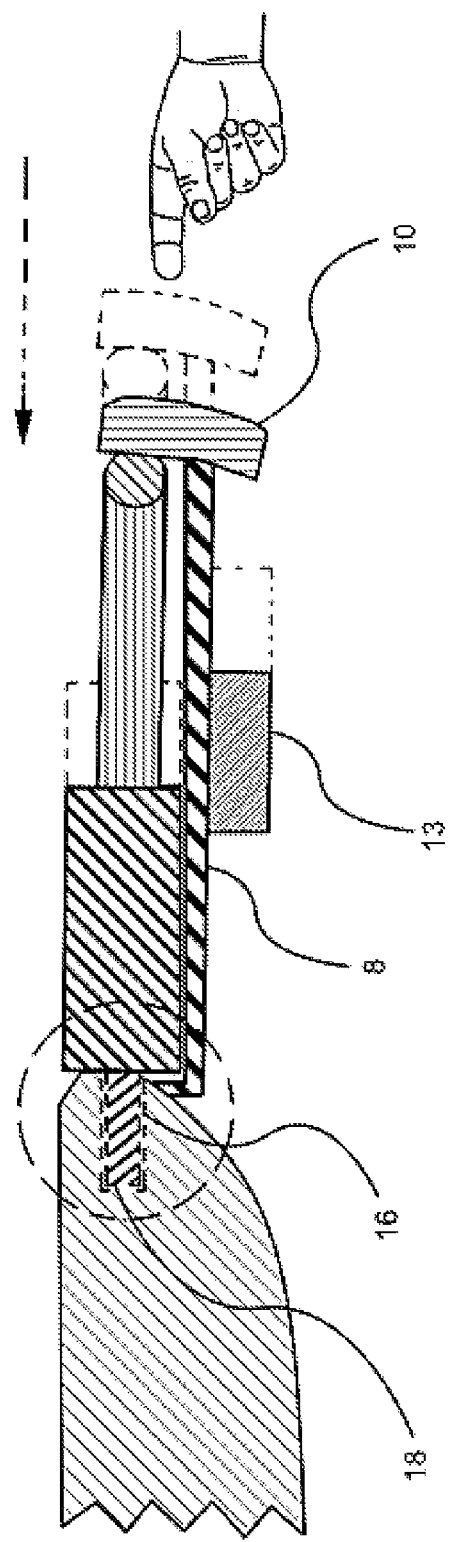

FIG. 10 shows a sectional view of a tablet and cable slide being used to align and insert an unmodified tablet data cable connector into a Tablet connector.

Figure 11:
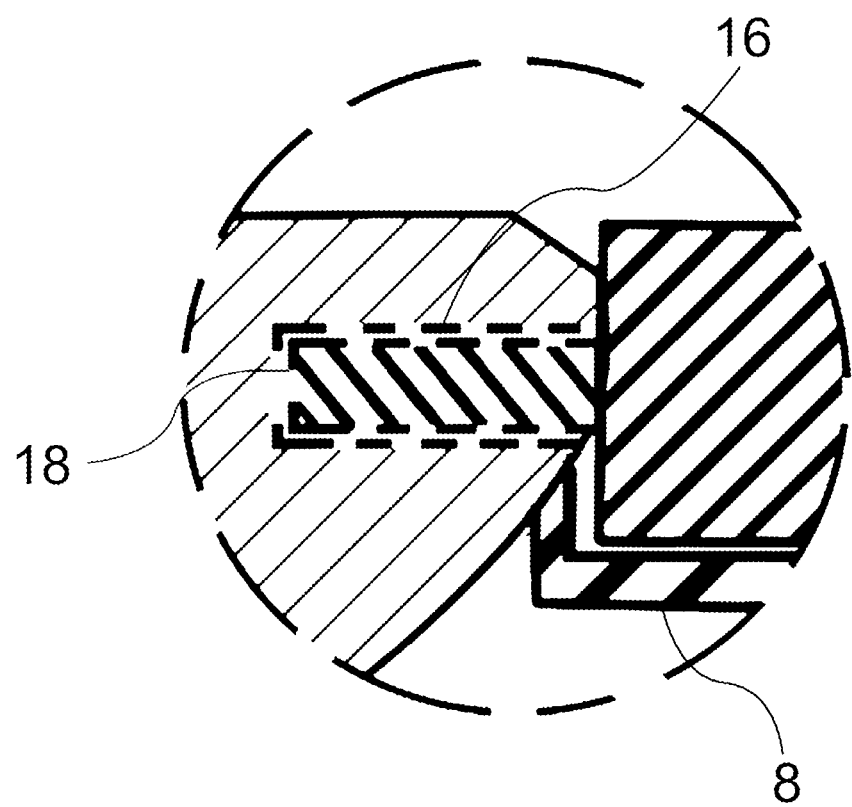

FIG. 11 shows a portion of the view in FIG. 10 enlarged for magnification perspective view of the tablet docking station with a tablet fully seated and the cable slide pushed into the fully inserted position.

Figure 12:
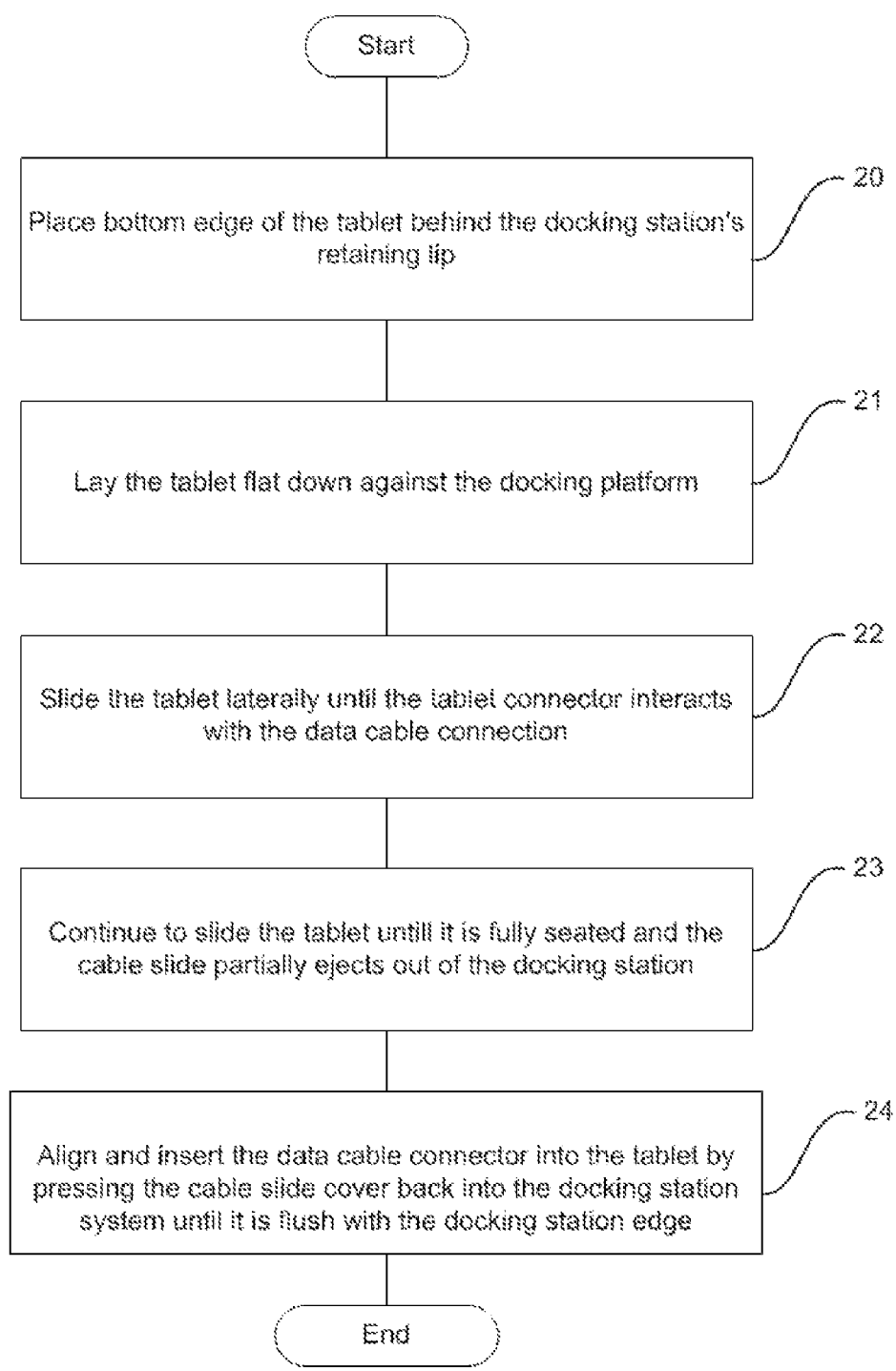

FIG. 12 shows the steps of the illustrative method of docking a tablet using the system of FIGS. 1-11.

LIST OF REFERENCE NUMBERS FOR THE MAJOR ELEMENTS IN THE DRAWING

The following is a list of the major elements in the drawings in numerical order.

1 tablet
2 docking station
3 stand
4 docking platform
6 retaining lip
7 cable slide
8 cable slide platform
9 stopper
10 cable slide cover
12 elevated cable tabs
13 elevated guide tabs
14 elevated guide rails
15 connector retainer
16 tablet connector
17 unmodified tablet data cable
18 unmodified tablet data cable connector
20 (step of) positioning tablet behind docking station lip (step of) laying the tablet flat on the docking station
21 platform
22 (step of) sliding the tablet
23 (step of) sliding until cable slide is ejected (step of) aligning and inserting the data cable
24 connector into the tablet

DETAILED DESCRIPTION OF THE INVENTION

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to."

Mode(s) For Carrying Out the Invention

The preferred embodiment of the present invention is described herein in the context of a tablet and a docking station system having a self-aligning data connector, but is not limited thereto, except as may be set forth expressly in the appended claims.

Referring first to FIG. 1, the docking station 2 has a substantially planar docking platform 4 for supporting a tablet 1 (show in FIGS. 7-9). One edge of the tablet 1 is placed in a groove formed by a retaining lip 6. The retaining lip 6 runs along the bottom of tablet 1 docking station docking platform 4. The tablet 1 is then laid flat against the docking platform 4. It should be noted, that the tablet 1 is still able to slide longitudinally while one of its edges is behind retaining lip 6. The tablet 1 is then moved towards a data cable connector 18 of an unmodified data cable 17 that was previously been routed through the docking station 2. The data cable is mounted on a sliding cable slide 7. The docking platform 4 is mounted in a landscape orientation (horizontally) on the stand 3. In other embodiments the docking platform 4 can be mounted in a portrait orientation (vertically) on the stand 3. Yet in other embodiments, the docking platform 4 is pivotally mounted on the stand 3, so that it may alternate between orientations according to a user's preference.

Referring now to FIGS. 2-5, the tablet data cable 17 is an ordinary off-the-shelf cable. Frequently, these cables are bundled by manufacturers together with the specific tablet purchased. Most of the time, replacement or additional tablet data cables can easily be purchased. According to the preferred embodiment, after a tablet data cable 17 is purchased, it is subsequently secured to the cable slide 7 by pressing it into elevated cable tabs 12 located on the cable slide platform 8. In one embodiment, the cable is prevented from slipping by resting a portion against a stopper 9.

Guides further help support the cable slide 7, in the form of one or more elevated guide tabs 13 underneath it the guide platform 8. The tabs further guide the cable slide 7 when a tablet is pushing it out of the docking station 2 and while a user is pushing it back into the docking station 2.

Referring now to FIG. 6, as the tablet 1 is slid along the retaining lip 6 towards the fully seated position, the small connector tolerance results in the tablet connector 16 pushing against the data cable connector 18 and thereby continue to push out the cable slide 7 until the tablet 1 is fully seated. In one embodiment, one or more guide rails 14, longitudinally disposed on the docking platform 4, help provide directional guidance for the cable slide 7 using one or more guide tabs 13 located underneath the cable platform 8.

Referring now to FIGS. 7-11, as the user slides the tablet 1 into its fully seated position, the tablet data connector 16 will interact with the data cable connector 18 pushing it, and at the same time, the cable slide 7 it is mounted on, to partially pop out of the docking station 2. FIGS. 7 and 8 show the cable slide 7 pushed out while.

Referring now to FIGS. 9-11, at this point, the user can press the cable slide cover 10 back into the docking station 2 to align and insert the cable connector 18 into the tablet connector 16. FIGS. 9-11 show the tablet 1 fully seated and cable slide 7 pushed in so that it is flush with the docking station 2.

Referring now to FIG. 12, the method of using of using the docking station comprises: (step 20) placing an one edge of the tablet behind the elevated retaining lip; (step 21) laying the tablet flat down against the docking platform; (step 22) sliding the tablet until the tablet connector interacts with the data cable connector; (step 23) pushing the tablet until cable slide is partially out of the docking station; and (step 24) pushing the cable slide cover back into the docking station system, thereby guiding the data cable into a proper alignment with the tablet connector and fully inserting the unmodified tablet data cable connector.

Alternate Embodiments

Alternate embodiments may be devised without departing from the spirit or the scope of the invention. For example, the tablet may be in the form of a cell phone, a Personal Digital Assistant (PDA), a smartphone, a Global Positioning System (GPS), a Ultra-Mobile PCs, a handheld game console, a portable media player, a digital camera, a pager, a home automation controller, lighting controller, or any dock-able device having a connector. By way of another example, the type of data cable connector is not limited to a specific type. Accordingly, data cable connector could be of any connector type that is appropriate for the device being docked. In another example, the location of male and female connectors can be reversed. In yet another example, other cables besides the data cable may be used with the docking station, e.g., NC power, fiber optic, radio frequency antenna, security dongle, etc.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives.

What is claimed is:

1. A docking station system for a tablet having a data connector, said docking station comprising:
   (a) a substantially planar docking platform (4) for receiving said tablet (1);
   (b) an elevated retaining lip (6) along the lower edge of said docking platform (4), said retaining lip (6) for slidibly engaging one edge of said tablet (1);
   (c) a cable slide (7) having a cable platform, said cable platform having one or more elevated cable tabs (12) for mechanically securing an unmodified tablet data cable (17) thereon; said cable slide (7) further having a cable slide cover (10) for covering and pushing said cable slide (7) into said docking station (2) until said cable slide cover (10) is flush with said docking station; and
   (d) an elevated retaining lip extending along the upper lower edge of said docking platform (4).

2. The docking station system of claim 1, wherein said planar docking platform (4) has two elevated guide rails (14), each parallel to the other.

3. The docking station system of claim 1, wherein said data cable (17) is the actual cable provided by its manufacturer.

4. The docking station system of claim 1, wherein said docking station (2) is mounted in a landscape view position on a stand (3).

5. The docking station system of claim 1, wherein said elevated retaining lip (6) is the only retaining lip along edge of said docking platform (4).

6. A docking station system for a tablet having a data connector, said docking station comprising:
   (a) a substantially planar docking platform (4) for receiving said tablet (1);
   (b) an elevated retaining lip (6) along the lower edge of said docking platform (4), said retaining lip (6) for slidibly engaging one edge of said tablet (1);
   (c) a cable slide (7) having a cable platform, said cable platform having one or more elevated cable tabs (12) for mechanically securing an unmodified tablet data cable (17) thereon; said cable slide (7) further having a cable slide cover (10) for covering and pushing said cable slide (7) into said docking station (2) until said cable slide cover (10) is flush with said docking station;
   (d) one or more guide rails disposed longitudinally on said docking platform (4); and
   (e) a plurality of elevated guide tabs (13) disposed underneath said cable platform for guidance by said guide rails.

7. A method for aligning and inserting a tablet data cable routed inside docking station system to a tablet connector, the docking station comprising a substantially planar docking platform having an elevated retaining lip and one or more elevated guide rails, a cable slide having a cable platform having one or more elevated cable tabs for mechanically securing said unmodified tablet data cable, and a cable slide cover providing a surface area for a user to push on, the method comprising:
   (a) placing (step of 20) one edge of said tablet behind said elevated retaining lip;
   (b) laying (step of 21) said tablet flat down against said docking platform;
   (c) sliding (step of 22) said tablet until said tablet connector interacts with said data cable connector;
   (d) sliding (step of 23) said tablet into a fully seated position thereby ejecting said cable slide partially out of said docking station; and
   (e) pushing (step of 24) said cable slide cover back into said docking station system, thereby guiding said data cable connector into a proper alignment with said tablet connector and fully inserting said tablet data cable connector.

8. A method for using a docking station and a third-party data cable secured therein, the docking station comprising a substantially planar docking platform, said platform comprising an elevated retaining lip, a cable slide having a device data cable, and a cable slide cover for a user to push on, the method comprising:
   (a) placing one edge of a device behind said elevated retaining lip;
   (b) laying said device flat down against said docking platform;
   (c) sliding said device until said device connector interacts with said data cable connector;
   (d) sliding said device into a fully seated position thereby ejecting said cable slide partially out of said docking station; and
   (e) pushing said cable slide cover back into said docking station system, thereby guiding said data cable connector into a proper alignment with said device connector and fully inserting said device data cable connector.

9. The method of claim 8, wherein the steps of ejecting said cable slide partially out and pushing said cable slide cover back into said docking station are carried out using one or more guide rails disposed longitudinally on said docking platform; and a plurality of elevated guide tabs disposed underneath said cable slide for guidance by said guide rails.

\* \* \* \* \*